United States Patent

McCullough et al.

[11] Patent Number: 5,585,086
[45] Date of Patent: Dec. 17, 1996

[54] METHOD FOR ENHANCING DIGESTION REACTION RATES OF CHEMICAL SYSTEMS

[75] Inventors: Edward D. McCullough, Riverside; Robert D. Waldron, Hacienda Heights, both of Calif.

[73] Assignee: Rockwell International Corporation, Seal Beach, Calif.

[21] Appl. No.: 300,898

[22] Filed: Sep. 6, 1994

[51] Int. Cl.$^6$ ............................................. B01F 1/00
[52] U.S. Cl. ............................................. 423/658.5
[58] Field of Search ........................... 423/658.5, 132; 204/157.42

[56] References Cited

U.S. PATENT DOCUMENTS

| | | | |
|---|---|---|---|
| 3,255,999 | 6/1966 | Weston | 259/2 |
| 3,291,640 | 12/1966 | Livingston | 134/1 |
| 3,525,606 | 8/1970 | Bodine | 75/101 |
| 3,731,877 | 5/1973 | Nekrasov et al. | 239/102 |
| 4,044,116 | 8/1977 | Eisentrant et al. | 423/132 |
| 4,069,296 | 1/1978 | Huang | 423/132 |
| 4,168,295 | 9/1979 | Sawyer | 422/111 |
| 4,369,100 | 1/1983 | Sawyer | 204/157.42 |
| 4,529,506 | 7/1985 | Smit | 209/13 |
| 4,566,800 | 1/1986 | Bodine | 366/118 |
| 4,652,309 | 3/1987 | Bodine | 75/101 |
| 4,763,677 | 8/1988 | Miller | 134/105 |
| 4,780,138 | 10/1988 | Bodine | 75/101 |
| 4,879,011 | 11/1989 | Schram | 204/157.42 |
| 4,883,532 | 11/1989 | Bodine | 423/27 |
| 4,914,256 | 4/1990 | Rodewald | 585/726 |

FOREIGN PATENT DOCUMENTS

| | | | |
|---|---|---|---|
| 844683 | 11/1976 | Belgium | 423/658.5 |
| 1659086 | 6/1991 | U.S.S.R. | 423/658.5 |

*Primary Examiner*—Steven Bos
*Attorney, Agent, or Firm*—George A. Montanye; Harry B. Field; Lawrence N. Ginsberg

[57] ABSTRACT

The present invention is a method for enhancing reaction rates when digesting chemical systems which form passivating layers. Particles are introduced into a digestion fluid bath. Digestion is allowed to proceed until passivating layers of digestion products have partially formed on the particles. The layers constitute a diffusion barrier to the digestion fluid and reduce the digestion rate. The particles are periodically conveyed through an ultrasonic beam to remove portions of the passivating layers. Thus, fresh surfaces of the particles are exposed to the digestion fluid bath. The periodic conveyance is such that a desired rate of digestion is obtained.

3 Claims, 2 Drawing Sheets

METHOD FOR ENHANCING DIGESTION REACTION RATES OF CHEMICAL SYSTEMS

BACKGROUND OF THE INVENTION

1. Field of the Invention

This invention relates to digestion with chemical systems which form passivating layers, and more particularly to the use of ultrasonic comminution to enhance the reaction rates by the removal of passivating layers.

2. Description of the Related Art

Hydrofluoric acid is routinely used for the dissolution and digestion of various silicate and other mineral samples and of glasses for chemical analysis, for processing and for other uses where is it is necessary to solubilize the material. Passivating layers may sometimes form in the digestion of certain minerals (such as the tungsten containing mineral, scheelite), often containing high levels of calcium. In systems where passivating layers form, the digestion rate can slow dramatically and it is necessary to take steps to destroy or de-passivate this layer. Typically the steps are the addition of additional acid or of other ions that complex free fluoride so as to make this layer soluble. This is often undesirable as this means adding materials to solution which have to be removed, recycled or recovered.

U.S. Pat. No. 4,168,295, issued to H. T. Sawyer, discloses an apparatus for enhancing chemical reactions in a constantly flowing stream of liquid character fortified with oxidizing agents, such as air or oxygen or other chemical agents. The apparatus makes use of an inner resonant tube concentrically mounted within an outer resonant tube with the walls of the tube spaced from each other forming an annular passageway for the flow of liquid from one end of the passage to the other.

U.S. Pat. No. 4,879,011, issued to C. J. Schram, discloses supporting particulate matter in a fluid medium by means of an ultrasonic standing wave while a reaction is affected or controlled involving the material so supported, for example with the fluid medium or other material contained in the medium. In a preferred arrangement, the standing wave is established by opposed ultrasonic transducers producing convergent beams that compensate for attenuation of the ultrasonic energy in the fluid medium, and operating in the near field.

U.S. Pat. No. 3,525,606, issued to an A. G. Bodine, discloses a method and apparatus for leaching and extracting materials comprised of utilizing a tank to which is fed the composition to be leached in the leaching solution. Acoustically coupled to the tank is an orbiting-mass oscillator with a suitable resonator element so as to effect high resonant sonic energy within the tank, to the degree that cavitation of the liquid is obtained.

SUMMARY OF THE INVENTION

The present invention is a method for enhancing reaction rates when digesting chemical systems which form passivating layers. Particles are introduced into a digestion fluid bath. Digestion is allowed to proceed until passivating layers of digestion products have partially formed on the particles. The layers constitute a diffusion barrier to the digestion fluid and reduce the digestion rate. The particles are periodically conveyed through an ultrasonic beam to remove portions of the passivating layers. Thus, fresh surfaces of the particles are exposed to the digestion fluid bath. The periodic conveyance is such that a desired rate of digestion is obtained.

The present invention derives advantages over previous digestion processes by not requiring other chemical additives than the digestant. It differs from other ultrasonic techniques by being directed to the removal of passivating layers and not requiring resonance or cavitation, although these may occur in certain circumstances. The prior art utilizes ultrasonics for liquid mixing of the digestant. The present invention, on the other hand, is not used for the mixing of reactants (either gaseous or liquid).

Furthermore, the present invention is not used to levitate particles with ultrasonic waves. Instead, particles are entrained in the flow.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
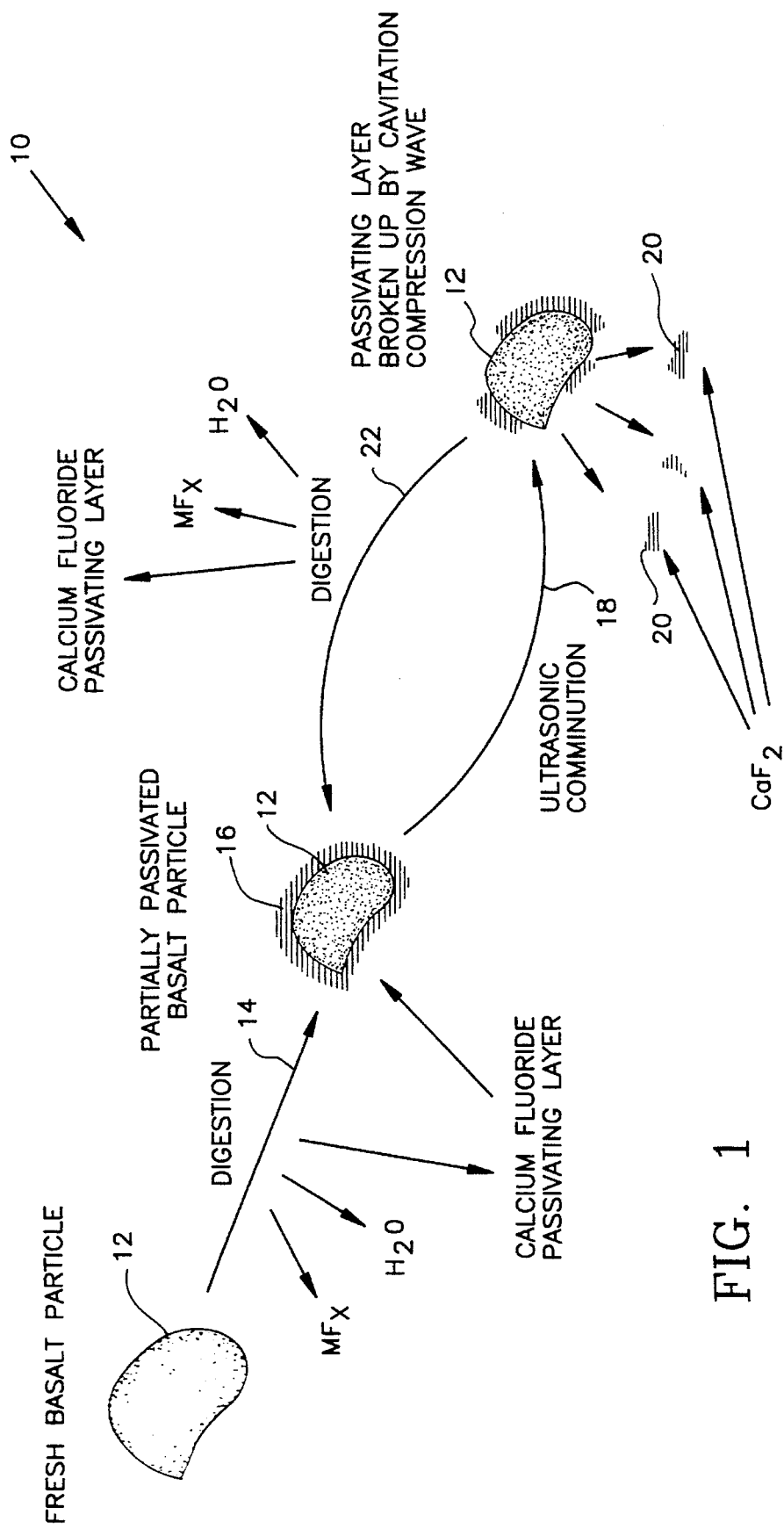
FIG. 1 is a schematic diagram representing the preferred method of the present invention as indicated in a fluoroacid digestion process.

Referring now to the figures and the characters of reference marked thereon, FIG. 1 illustrates the method of the present invention, designated generally as 10. Particles of feed 12 are provided. Such particles 12 may comprise silicate systems such as lunar soils, basaltic soils, coal ash, industrial slag (containing significant metal values), and other industrial slags and natural materials not containing silica (e.g. scheelite, $CAWO_4$) which can be dissolved in leachants (e.g. fluoroacids) using the process described hereinafter. The particles 12 generally range from about 1 micron to about 1,000 microns in diameter.

Particles 12 are introduced into a digestion fluid bath at temperatures generally less than 110° C. This acid digestion is in a stirred vessel. The initial digestion rate is rapid; however, it decays within about 15 minutes as passivating layers are formed. In the preferred method, the digestion fluid bath comprises mixed fluoroacids and water. Typical mixed fluoroacids may contain fluorotitanic, fluorosilicic, and hydrofluoric acids and water. A preferred digestion fluid bath comprises a mixture of approximately ⅓ water, approximately ⅓ 49% hydrofluoric acid, and approximately ⅓ 60% fluorotitanic acid. The concentration of hydrofluoric acid and protons are varied as necessary to control the free-fluoride content to separate alkaline earth species from the remainder of the digested material via differential solubility.

At the initiation of digestion 14, the passivating layers do not exist and digestion proceeds at an expeditious rate which would allow for rapid digestion. However, the digestion rate decays rapidly due to the formation of passivating layers which build up from fluoride digestion products. For example, if coal fly ash is being digested by fluoroacid, the passivating layers would comprise alkaline earth fluorides such as calcium fluoride and magnesium fluoride. The passivating layer is designated 16 in FIG. 1.

There is a progressive build up of passivating materials 16. The soluble reactants of the digestant must diffuse inwardly through this layer and the soluble reaction products must diffuse outwardly to sustain the chemical reaction in the unreacted portion of the particle 12. The progressive build up reduces the rate of digestion by increasing the diffusion time. A balance must be struck in the acceptability of the diffusion rate and the removal of the passivating layers. What is desired is an effective or average diffusion rate, which may be less than what is available initially, but must be much better than that which would be available if the passivating layers were allowed to form unhindered.

This balance is achieved by periodically conveying the particles 12 through an ultrasonic beam to remove portions of the passivating layers 16, thereby exposing fresh surfaces of the particles 12 to the digestion fluid bath. Subsequently, the diffusion barriers begin to reform on the freshly exposed surfaces. The fresh surfaces are digested at the initial digestion rate and begin the build up of diffusion barriers. The balance is struck by recycling the particle 12 from the digestion vessel where digestion 14 occurs into the ultrasonic beam as shown by numeral designation 18, the passivating layers or portions thereof are removed, as shown by numeral designations 20 and then the particle 12 is removed from the ultrasonic beam, returned to the digestion vessel and allowed to digest, as noted by numeral designation 22. The particles 12 are periodically recycled into the beam removing fractions of the passivating layers and the particle gets progressively smaller until the digestion is complete.

The ultrasound is primarily used to remove the passivating layers 16, only, and not to reduce the undigested portions of particle 12 in size.

The passivating layer is generally both brittle and softer or weaker than the original particle substance. For example, calcium fluoride has a hardness value only about 20 to 30 percent of that of common silicate minerals such as present in basalt. When a passivated particle enters a region of increasing amplitude oscillating pressure waves of a fluid, one would expect that a critical stress would first develop in the passivating layer leading to fracture and that similar fracture would only develop in the original material if exposed to a substantially high level of pressure or stress. The pressure wave needed to fracture the passivating layer could develop either in the pure liquid phase or alternately in the collapse of a vapor bubble generated by fluid cavitation.

A multi-particle mechanism which may contribute to passivating layer removal is stress due to collision between two or more particles due to ultrasonic agitation or pure fluid shear forces.

Generally available commercial ultrasonic transducers may be used for the ultrasonic comminution of the passivating layers. Transducer selection depends upon digestion vessel design.

The total fraction of time spent in the ultrasonic beam is adjusted for optimum power expenditure versus digestion rate. The duty cycle is defined as the time the particle spends in the ultrasonic beam divided by the time it spends in the ultrasonic beam plus the other portions of the digestion process. Such other portions might be conveyance to a separate vessel for digestion with subsequent return to the ultrasonic unit for comminution of the passivating layers, as required. It is preferred that the duty cycle be less than 0.1.

Figure 2:
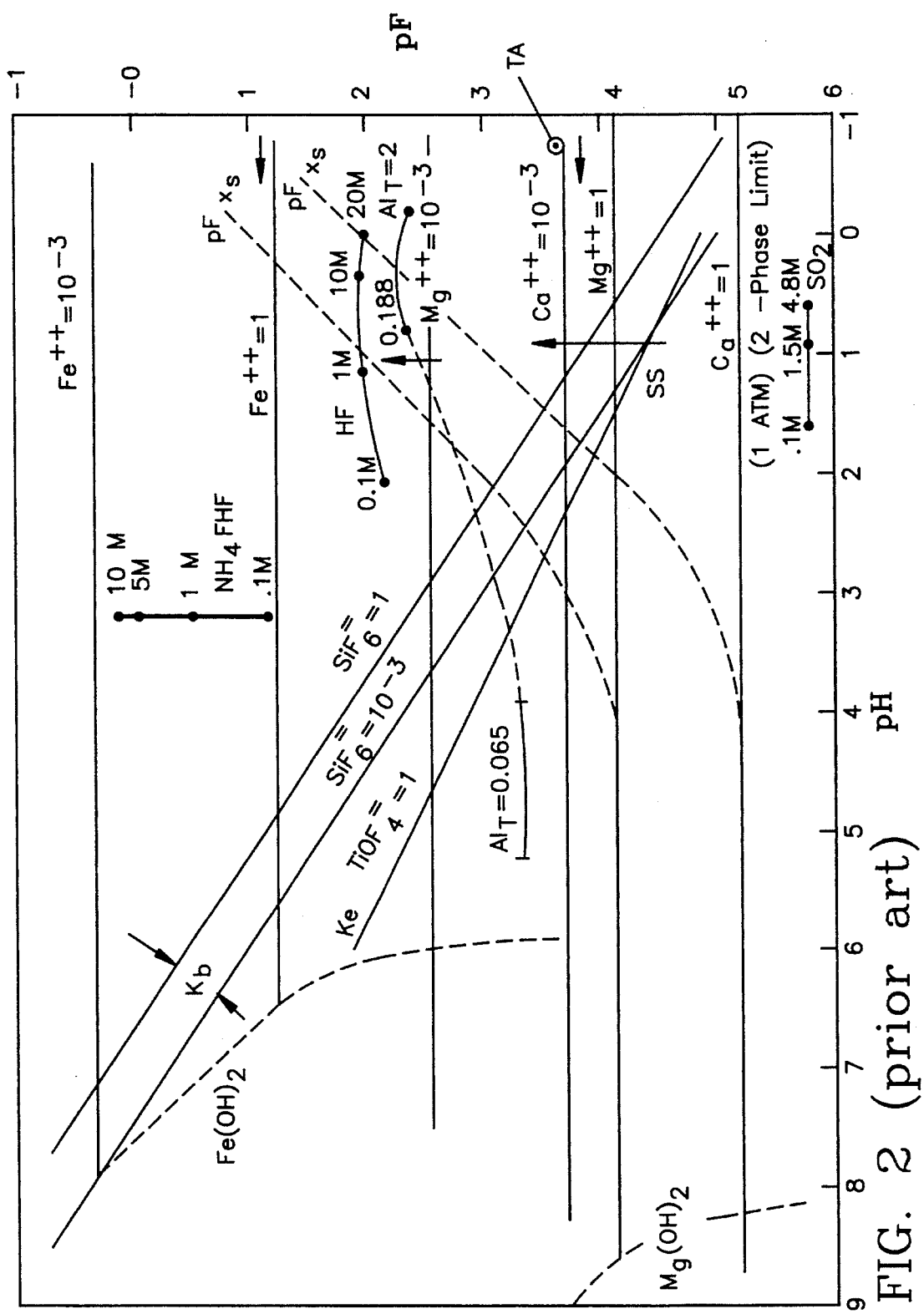
FIG. 2 (Prior Art) is a diagram showing solubility relations in fluoroacid digestion indicating that in regimes of practical interest it is not generally possible to avoid the formation of insoluble passivating layers.

Referring now to FIG. 2, equilibrium solubilities of typical species from silicate systems typical of coal fly ash, lunar soil, etc. The ordinate pF is the negative log of the free-fluoride concentration and the abscissa is the pH. This shows the differential solubilities of the alkaline earths calcium and magnesium as opposed to iron and aluminum. With increasing pF, more and more species become soluble. Decreasing pF refers to the greater availability of fluoride to form compounds with the alkaline earths to form passivating layers. Our preferred digestion regime is near a pF of 2.5. In this region both calcium fluoride and magnesium fluoride are essentially insoluble.

Leachants which may be present in the digestion fluid bath may include, but are not limited to sulfuric acid, sulfurous acid, phosphoric acid and its dehydration products, the various $HXO_n$ where $0 \leq n \leq 4$ and $X=Cl$, Br or I, hydrofluoric acid, fluoroacids such as $H_2SiF_6$, $H_2TiF_6$, $H_2ZrF_6$, $HSbF_6$, $HPF_6$, $HAsF_6$, $H_3AlF_6$, $H_3FeF_6$, etc., nitric acid, organic acids such as formic, acetic, oxalic, or citric, or those with higher carbon numbers, water or non-aqueous solutions of the these acids or their mixtures; or caustic, soda ash, potash, etc., their water solutions or mixtures of ammonia or amines, as well as various chelating agents such as EDTA, ethylene diamine, pyridine or other organic or inorganic materials.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for enhancing reaction rates when digesting chemical systems comprising fluoroacids which form passivating layers, comprising the steps of:

a) introducing particles comprising silicate minerals in a particle size range of from about one micron to about 1000 microns in diameter into a digestion fluid bath comprising fluoroacids;

b) digesting said particle until passivating layers of digestion products have partially formed on said particles, said layers constituting a diffusion barrier to the digestion fluid and reducing the digestion rate;

c) conveying said particles through an ultrasonic beam to remove portions of said passivating layers, thereby exposing fresh surfaces of said particles to said digestion fluid bath; and d) recycling said particles through said ultrasonic beam, said particles getting progressively smaller until digestion is complete.

2. The method of claim 1 wherein said step of introducing said particles into a digestion fluid bath comprises introducing said particles into a mixture of approximately one-third water, approximately one-third hydrofluoric acid, and approximately one-third fluorotitanic acid.

3. The method of claim 1 wherein said step of recycling comprises periodically conveying with a duty cycle less than 0.1.

* * * * *